(12) United States Patent
Tanaka

(10) Patent No.: US 6,961,494 B2
(45) Date of Patent: Nov. 1, 2005

(54) OPTICAL WAVEGUIDE DEVICE

(75) Inventor: Takehito Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 177 days.

(21) Appl. No.: 10/292,494

(22) Filed: Nov. 13, 2002

(65) Prior Publication Data
US 2004/0001672 A1 Jan. 1, 2004

(30) Foreign Application Priority Data

Jun. 27, 2002 (JP) ........................................ 2002-187270

(51) Int. Cl.⁷ .............................. G02B 6/26; G02B 6/42
(52) U.S. Cl. ................................ 385/40; 385/3; 385/8; 385/140; 333/156; 333/161; 333/238
(58) Field of Search ............................. 385/3, 8, 9, 40, 385/140; 359/245, 246, 254, 315, 322; 333/156, 161, 238

(56) References Cited

U.S. PATENT DOCUMENTS

| | | | |
|---|---|---|---|
| 5,991,491 A | 11/1999 | Madabhushi | 385/131 |
| 6,033,126 A | 3/2000 | Omori et al. | 385/88 |
| 6,192,167 B1 * | 2/2001 | Kissa et al. | 385/3 |
| 6,429,959 B1 | 8/2002 | Gopalakrishnan et al. | 359/254 |
| 6,483,953 B1 * | 11/2002 | McBrien et al. | 385/2 |
| 6,580,843 B2 | 6/2003 | Doi et al. | 385/14 |
| 6,584,240 B2 | 6/2003 | Doi et al. | 385/2 |
| 6,646,522 B1 * | 11/2003 | Kozyrev et al. | 333/161 |
| 6,711,308 B2 * | 3/2004 | Erben et al. | 385/3 |
| 6,741,379 B2 | 5/2004 | Kaitoh et al. | 385/279 |
| 6,768,570 B2 | 7/2004 | Sugiyama et al. | 359/237 |
| 2002/0126933 A1 * | 9/2002 | Goh et al. | 385/2 |
| 2002/0190359 A1 * | 12/2002 | Shaw et al. | 257/678 |
| 2003/0053730 A1 | 3/2003 | Seino | 385/2 |

FOREIGN PATENT DOCUMENTS

| | | | | |
|---|---|---|---|---|
| JP | 61-190322 | 8/1986 | | G02F/1/31 |
| JP | 63-316901 | 12/1988 | | H01P/5/08 |
| JP | 6-130338 | 5/1994 | | G02F/1/035 |
| JP | 9-23108 | 1/1997 | | H01P/5/08 |
| JP | 10-123472 | 5/1998 | | G02F/1/035 |
| JP | 10-213783 | 8/1998 | | G02F/1/035 |
| JP | 2000-131658 | 5/2000 | | G02F/1/035 |
| JP | 2000-241780 | 9/2000 | | G02F/1/035 |
| JP | 2001-230606 | 8/2001 | | H01P/3/08 |

* cited by examiner

Primary Examiner—John D. Lee
Assistant Examiner—Daniel Petkovsek
(74) Attorney, Agent, or Firm—Staas & Halsey LLP

(57) ABSTRACT

The attenuation from connectors to the interaction region of the light signal with the microwave can be reduced, and the bandwidth can be improved in an optical waveguide device, in which a space between strip lines on a ceramic substrate at one end of the strip lines connected to first and second input sections is adapted to be narrower than a space between the strip lines at the other end of the strip lines connected to first and second electric connectors.

17 Claims, 5 Drawing Sheets

OPTICAL WAVEGUIDE DEVICE

BACKGROUND OF THE INVENTION

1. Field of the Invention

The present invention relates to an optical waveguide device having optical waveguides and using a piezoelectric substrate that imparts an electro-optical effect to light signals. More particularly, the invention relates to an optical waveguide device suited to a Mach-Zender-type optical modulator.

2. Description of the Related Arts

An optical waveguide device, a kind of the Mach-Zender-type optical modulator, capable of separately controlling the phase of light signals propagating along a first and a second waveguides extending in parallel relationship is known as a Dual-Drive-type optical modulator conducting an optical intensity modulation by controlling the phase of the light signals propagating along the first and second waveguides with external high-frequency electrical signals and is used in a high speed long-distance optical communication transmission system.

In such a Dual-Drive-type optical modulator, separate control is provided of the phase of light signals propagating along a first and a second optical waveguides (for convenience, each may be referred to as "arm") extending in parallel relationship formed on a piezoelectric substrate having an electro-optical effect, by use of external electrical signals. That is, it is possible to separately control the refractive index of the optical waveguide of each arm.

FIG. 1 is a schematic view illustrating the principle of such a Dual-Drive-type optical modulator.

In FIG. 1, a first and a second optical waveguides 10, 11 are formed on a piezoelectric substrate 1 and a light signal from an optical input section (OPT-in) is branched and input commonly to the optical waveguides. The light signals propagated on the first and the second waveguides are coupled at and output from an optical output section (OPT-out).

Progressive wave electrodes 20, 21 are provided in the proximity of each arm of the optical waveguides 10, 11 such that electric fields are efficiently applied to the first and the second waveguides 10, 11. That is, one of the progressive wave electrodes 20 (21) controls the phase of the light signal propagating along one arm 10 (11) and the other progressive wave electrode 21 (20) controls the phase of the light signal propagating along the other arm 11 (10).

In order to realize a meaningful optical modulation using an optical modulator as above, it is necessary to input, synchronizing the timing, a modulation signal (for example, DATA=Q and the inversion of the DATA=/Q) in the microwave band correlated to each of the progressive wave electrodes 20, 21.

FIG. 2 illustrates an example of V1=Q and V2=/Q as the modulation signals in the microwave band input to the progressive wave electrodes 20, 21 in FIG. 1. FIG. 3 illustrates an optically modulated light signal output in response to the phase difference between these modulation signals V1=Q and V2=/Q.

Then, usually, in the Dual-Drive-type optical modulator, the progressive wave electrode 20, 21 are formed in parallel with respectively the optical waveguides 10, 11 as shown in FIG. 1. In addition, input sections 20-1, 21-1 are arranged on the same side as the optical wave 10, 11 as strip lines.

Furthermore, the space between the input sections 20-1, 21-1 constituted by the strip lines of the progressive wave electrode 20, 21 is arranged being different from the space between the electric connectors for inputting a microwave as a modulation signal. The electric field applied to the light signal propagating each of the arms interacts with each of the light signals with a different phase due to the relative phase relation of the synchronized input microwave at the electric connectors as shown in FIG. 2 produced by the difference between these spaces.

In order to avoid the above, delay lines for correcting the timing (i.e., routing structures of the strip lines) are provided on the piezoelectric substrate 1 taking into consideration the difference between the space between the input sections 20-1, 21-1 and the space between the electric connectors.

In the above conventional structure, the length of the delay lines provided on a chip are determined in proportion to the mounting pitch of the electric connectors on a housing. In this case, if the dielectric constant of the piezoelectric substrate 1 is large, then, the attenuation for the microwave over the length of the delay lines provided on the piezoelectric substrate 1 for adjusting the timing to reach the interaction region with the light signal becomes large. This is a factor which cause a bandwidth degradation of the optical modulator.

SUMMARY OF THE INVENTION

It is therefore the object of the present invention to provide an optical waveguide device enabling delay lines on the piezoelectric substrate to be shortened and ensuring improved transmission bandwidth.

To achieve the above object, according to a first aspect of the present invention there is provided an optical waveguide device comprising a piezoelectric substrate having an electro-optical effect, the piezoelectric substrate having thereon formed a first optical waveguide and a second optical waveguide that extend in parallel with each other, a first progressive wave electrode through which a first electrical signal progresses that interacts with a light signal propagating along the first optical waveguide to control the phase of the light signal, and a second progressive wave electrode through which a second electrical signal progresses that interacts with a light signal propagating along the second waveguide to control the phase of the light signal; the piezoelectric substrate having thereon arranged a first and a second input sections corresponding respectively to the first and the second progressive wave electrodes; and a ceramic substrate on which are formed strip lines connecting the first and second input sections with a first and a second electric connectors that supply the first and the second electrical signals corresponding thereto, respectively; wherein a space between the strip lines on the ceramic substrate at one end of the strip lines connected to the first and the second input sections is adapted to be narrower than a space between the strip lines at the other end of the strip lines connected to the first and the second electric connectors.

To attain the above object, according to a second aspect of the present invention there is provided an optical waveguide device having a piezoelectric substrate having an electro-optical effect; an input section optical waveguide formed on the piezoelectric substrate; an input-side waveguide branching section branching the input section optical waveguide into a first optical waveguide and a second optical waveguide that extend in parallel with each other; an output-side optical wave coupler section coupling the first optical waveguide and the second optical waveguide; a first progressive wave electrode through which a first electrical signal progresses that interacts with light propagating along the first optical waveguide to control the phase of the light; and a second progressive wave electrode through which a second electrical signal progresses that interacts with light propagating along the second optical waveguide to control the phase of the light; the piezoelectric substrate having arranged on the same side a first and a second input sections corresponding respectively to the first and the second progressive wave electrodes; the optical waveguide device comprising a ceramic substrate on which are formed strip lines connecting the first and second input sections with a first and a second electric connectors that supply the first and the second electrical signals corresponding thereto, respectively; wherein a space between the strip lines on the ceramic substrate at one end of the strip lines connected to the first and the second input section is adapted to be narrower than a space between the strip lines at the other end connected to the first and the second electric connectors.

Preferably, coplanar lines are formed as the strip lines formed on the ceramic substrate. $LiNbO_3$ may be used as the piezoelectric substrate having an electro-optical effect. The first and the second electrical signals may have a frequency in microwave band and constitute optical modulators.

The above and other objects, aspects, features and advantages of the present invention will become more apparent from the following detailed description of the preferred embodiments when taken in conjunction with the accompanying drawings.

DESCRIPTION OF THE PREFERRED EMBODIMENTS

In order to facilitate the understanding of the present invention, the conventional structure and its problems described above will further be described previous to the description of examples of embodiments of the invention.

Figure 1:
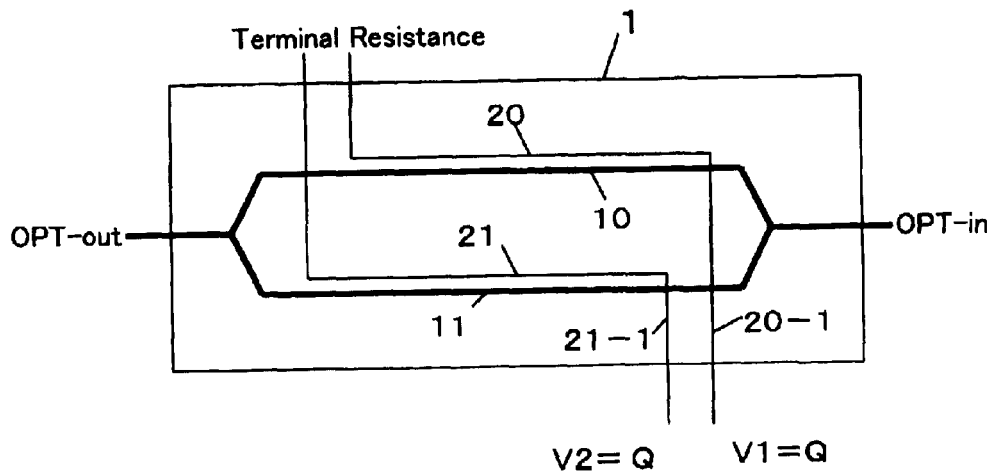
FIG. 1 is a schematic view illustrating the principle of a Dual-Drive-type optical modulator.
Figure 2:
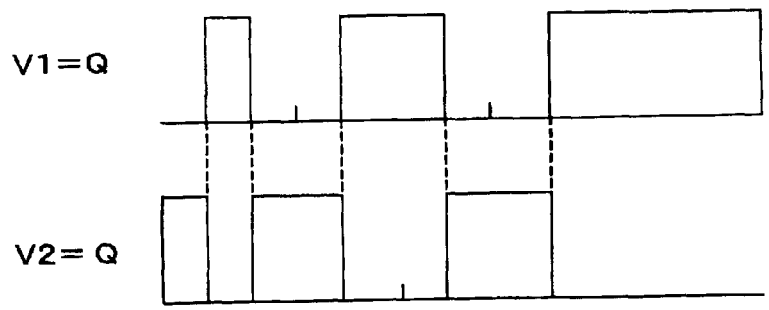
FIG. 2 illustrates an example of V1=Q and V2=/Q as the modulation signals in the microwave band input to the progressive wave electrodes 20, 21 in FIG. 1.
Figure 3:
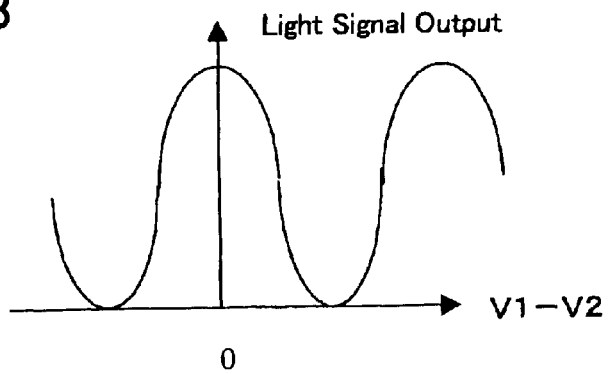
FIG. 3 illustrates an optically modulated light signal output in response to the phase difference between modulation signals V1=Q and V2=/Q shown in FIG. 2.
Figure 4:
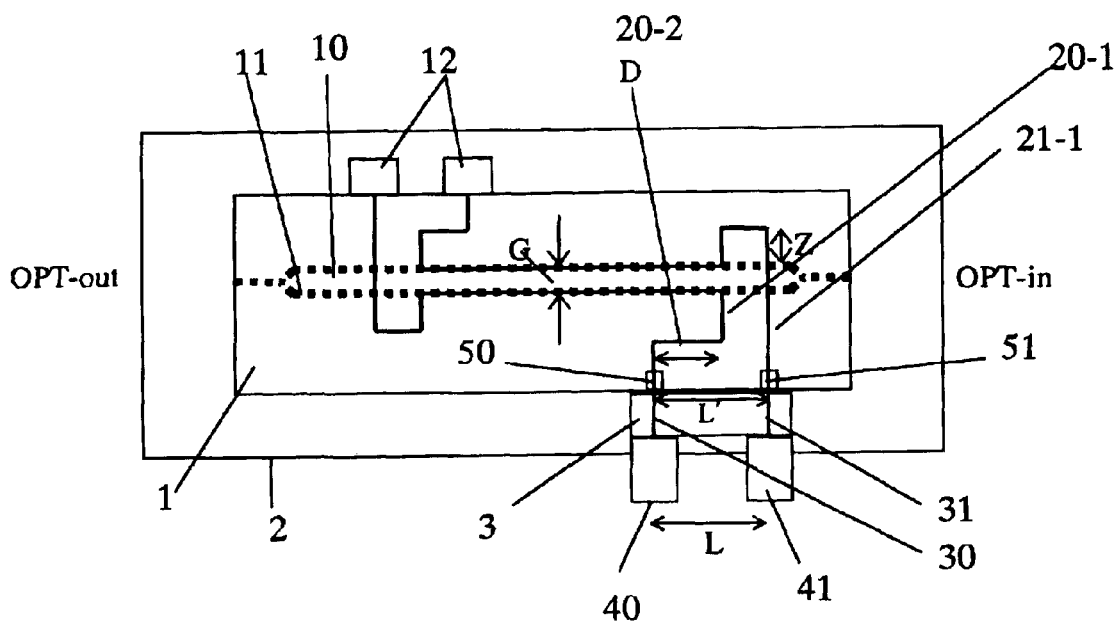
FIG. 4 illustrates an example of the structure of an optical modulator of the conventional structure.

FIG. 4 illustrates an example of the structure of an optical modulator of the conventional structure. A chip-shaped piezoelectric substrate 1 cut out from, for example, a $LiNbO_3$ crystal is contained in a housing 2.

The first and the second optical waveguides 10, 11 in parallel with each other with a constant space G are formed on the piezoelectric substrate 1. Each one end of the first and the second optical waveguides 10, 11 is an optical input section (OPT-in) and a light signal is input therefrom and propagates to an optical output section (OPT-out) on the opposite side, then, a modulated light signal is output therefrom.

Furthermore, progressive wave electrodes 20, 21 are arranged along the first and the second optical waveguides formed on the piezoelectric substrate 1. A ceramic substrate 3 is provided in the housing 2 on the side on which the first and the second waveguides 10, 11 are formed on the piezoelectric substrate 1.

A modulation signal is supplied to the progressive wave electrodes 20, 21 in the same direction as the propagation direction of the optical input signal. The modulation signal is terminated by the terminal resistance 12 after it has progressed along the optical waveguides 10, 11.

Each one end of the strip lines 30, 31 is connected to connectors 40, 41 for supplying a microwave from the outside. Each of the other ends of the strip lines is connected respectively to pads 50, 51.

The space between the input section 20-1, 21-1 of the first and the second optical waveguides 10, 11 and the space between the connectors 40, 41, therefore, the pads 50, 51 are different.

Thus, the input sections 20-1, 21-1 of the first and the second optical waveguides 10, 11 have a delay line 20-2 constituted by a routing strip line for correcting the difference of these spaces.

In this configuration as in FIG. 4, the length D of the delay line 20-2 for correcting the space between the pads 50, 51 and the space of arrangement between the connector 40, 41 is obtained as follows.

$$D=(L'+G+2Z)/2 \qquad (1)$$

where L' denotes the space between the pads, G denotes the space between the interaction regions of the two progressive wave electrodes 20, 21.

Figure 5:
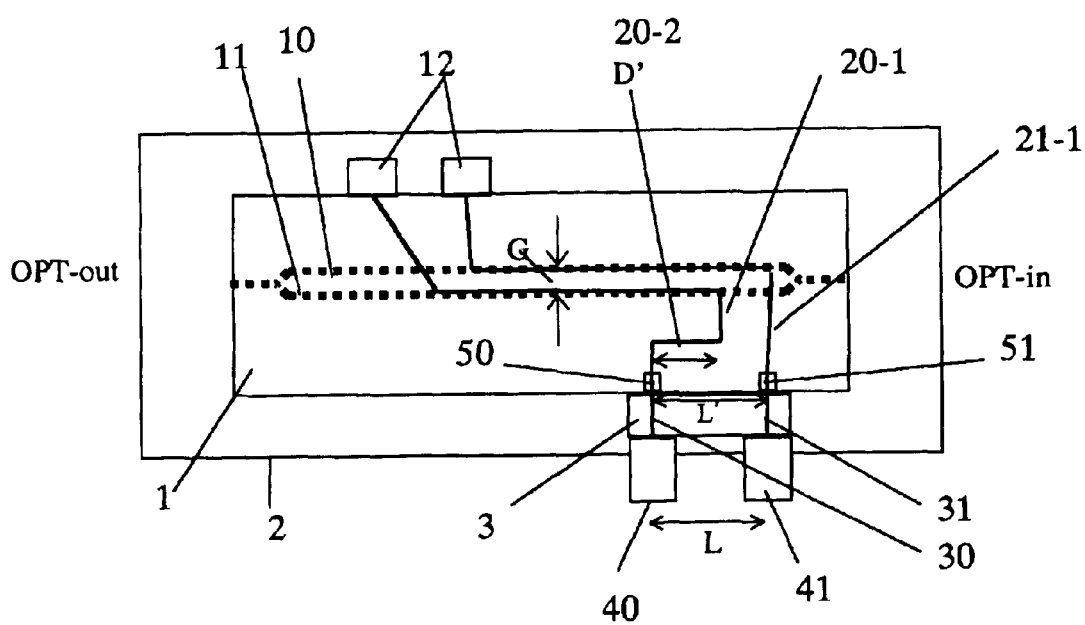
FIG. 5 illustrates an example of the structure obtained when Z=0 in the equation (1) in FIG. 4.

FIG. 5 illustrates an example of the structure obtained when Z=0 in the above equation (1).

The dielectric constant of the piezoelectric substrata 1 is relatively large comparing to the dielectric constant of the ceramic substrate 3 and to provide the delay line 20-2, in the region having a large dielectric constant, for adjusting the space between the pads 50, 51 and the space of the arrangement of the connectors 40, 41 results in a large attenuation of the microwave until it reaches to the interaction region, and, therefore, becomes a factor for causing a bandwidth degradation of the optical modulator.

Figure 6:
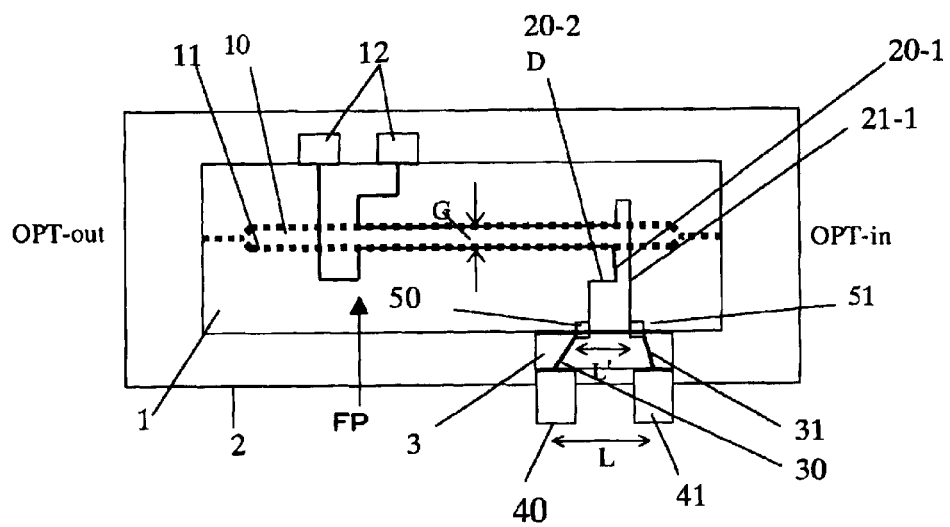
FIG. 6 illustrates an exemplary embodiment of the invention being depicted corresponding to FIG. 4 of the conventional example.

The invention solves such drawbacks. FIG. 6 illustrates an exemplary embodiment of the invention being depicted corresponding to FIG. 4 of the conventional example. The feature in FIG. 6 is the structure of the ceramic substrate 3 that is an intermediate substrate and the strip lines 30, 31 formed on the ceramic substrate 3 are not arranged in parallel to each other but the space between the pads 50, 51 is adapted to be narrower than the space of the arrangement between the connector 40, 41. The rest of the structure is same as the structure shown in FIG. 4.

Figure 7:
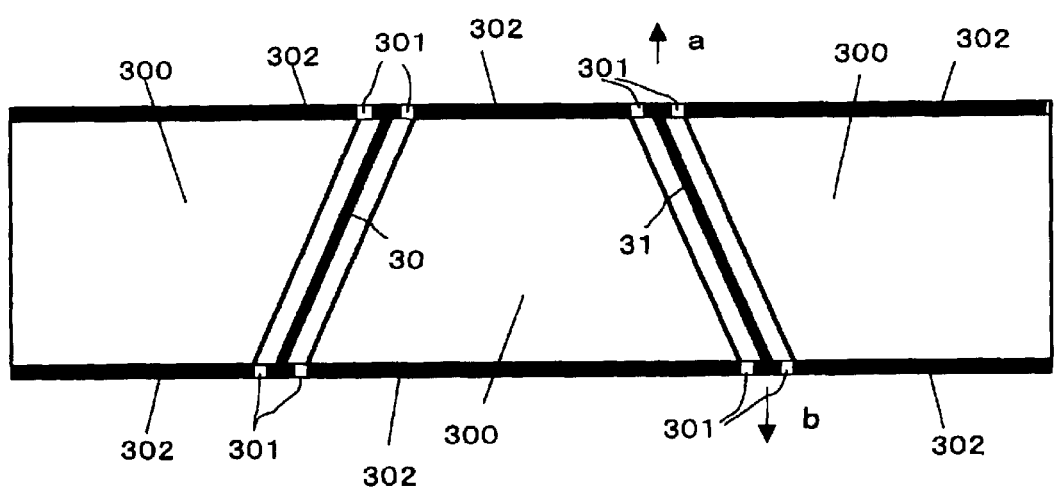
FIG. 7 is an enlarged view of the ceramic substrate 3 in FIG. 6.

FIG. 7 is an enlarged view of the ceramic substrate 3 in FIG. 6. In FIG. 7, a ceramic substrate with which a metal layer is vapor-deposited all over one side thereof is prepared. Then, the metal layer is removed by way of etching except for the regions for a earth conductor region 300 and the strip lines 30, 31 of the metal layer. Thus, the strip lines 30, 31 constitute coplanar lines.

The periphery of the strip lines 30, 31 at the end surface of the ceramic substrate 3 is applied with a hermetic sealing 301 of glass. In FIG. 7, the ends on "a" side of the strip lines 30, 31 are respectively connected to the pads 50, 51 and the ends on "b" side of the strip lines 30, 31 are respectively connected to the connectors 40, 41.

The other portion 302 of both end surface of the ceramic substrate 3 is earthed to the housing 2 with wax material.

Because of this structure of the ceramic substrate 3, in the invention, the length D of the delay line 20-2 for adjusting the space between the pads 50, 51 and the space of the arrangement between the connectors 40, 41 can be shortened.

Figure 8:
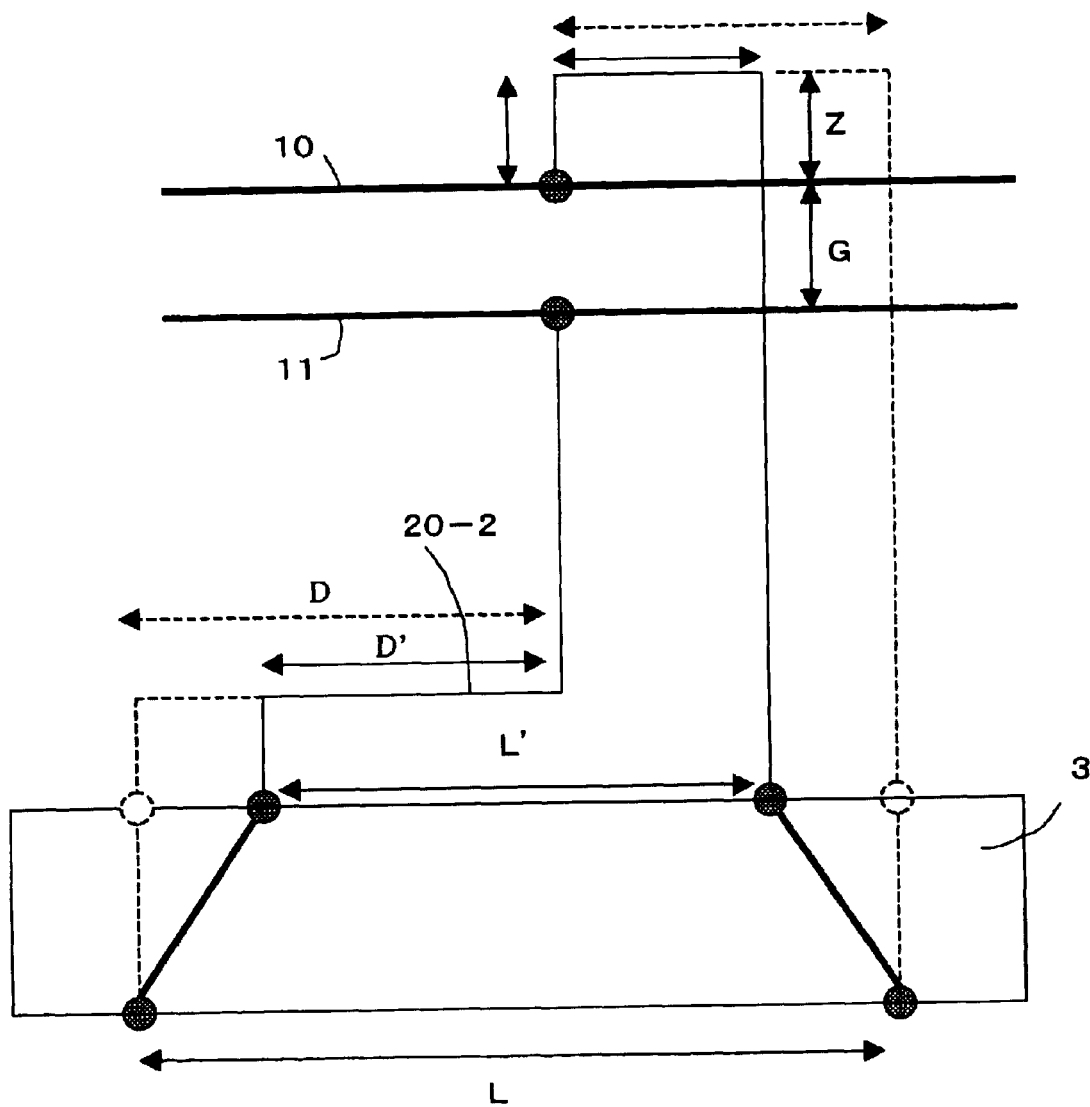
FIG. 8 illustrates the comparison of the length D' of the delay line 20-2 in the invention and the length D of the delay line 20-2 shown in FIG. 4 and FIG. 5.

FIG. 8 illustrates the comparison of the length D' of the delay line 20-2 in the invention and the length D of the delay line 20-2 shown in FIG. 4 and FIG. 5. The same numerals as in FIG. 4 are used in FIG. 8 indicating the components in FIG. 8 corresponding to those in FIG. 4.

In FIG. 8, the strip lines represented by the dotted lines correspond to those in FIG. 4 and the strip lines represented by the solid lines correspond to those according to the invention.

The length D' of the delay line 20-2 can also be represented by the above equation (1) but the space between the pads 50, 51 is narrower than the space between the connectors by (L-L').

Therefore, the length of delay line 20-2 is shortened by this (L-L') and the attenuation of the microwave produced until the microwave reaches the interaction region with the light signal can be reduced.

Figure 9:
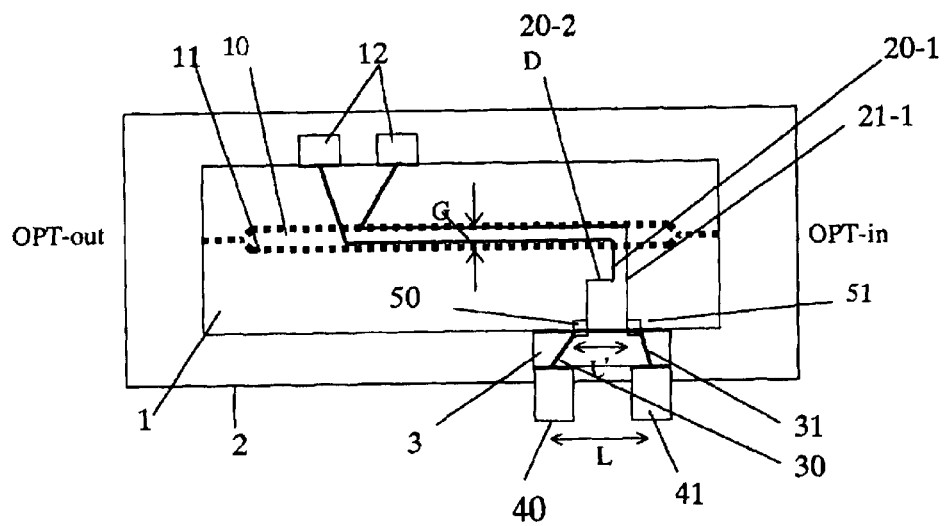
FIG. 9 illustrates an exemplary embodiment of the invention corresponding to that shown in FIG. 5.

FIG. 9 illustrates an exemplary embodiment of the invention corresponding to that shown in FIG. 5. Also in this embodiment, in the piezoelectric substrate 2 having a large dielectric constant, the length of the delay line 20-2 is shortened by (L-L') and the attenuation of the microwave produced until the microwave reaches the interaction region with the light signal can be reduced.

Taking into consideration the size of practical connectors 40, 41 as an example, L=L'=4 mm in the conventional example shown in FIG. 4 and FIG. 5 and a gap G between the first and the second waveguide 10, 11 is approximately G=0.2 mm and Z=0.2 mm.

In the conventional example shown in FIG. 4, the length of the delay line 20-2 is approximately D=2.3 mm. In the conventional example shown in FIG. 5, approximately D=2.1 mm.

In contrast, in the invention, when L' is approximately L'=11.0 mm, the length D' of the delay line 20-2 is approximately D'=0.8 mm for the example shown in FIG. 6 and approximately D=0.6 mm for the example shown in FIG. 9.

In either case described above, it is possible that the length of electrodes of the routing section (the length of the delay line 20-2) is shrunk by approximately 1.5 mm (L-L').

Figure 10:
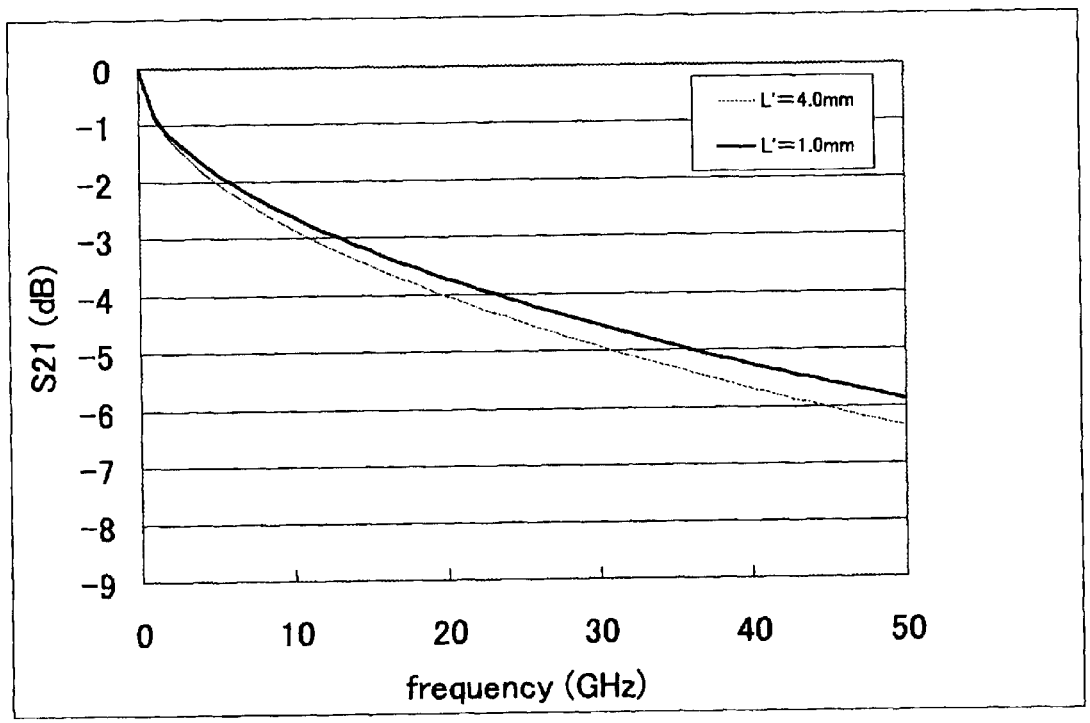
FIG. 10 is a chart illustrating the improvement of the microwave transmission property according to the invention.

When the entire electrode length from the input pads 50, 51 of the piezoelectric substrate 1 to the point (FP point in FIG. 6) where the light-microwave interaction is terminated is 20 mm, the microwave transmission property can be improved by virtue of a shrinking of the length of the electrode by 1.5 mm as shown in FIG. 10.

In FIG. 10, the characteristic impedance is set at 50 Ω and the axis of abscissa represents the input microwave frequency and the axis of ordinate represents the attenuation of the input microwave produced from the pads 50, 51 to a dummy load 12. L'=4 mm in the conventional example shown in FIG. 4 and L'=11.0 mm in a microwave transmission property chart for the embodiment according to the invention shown in FIG. 6. From FIG. 10, it will be understood that the microwave transmission property is improved over a wide bandwidth as a result of application of the present invention.

As described with the examples of the embodiments of the invention referring to the attached drawings, in a optical waveguide device, the attenuation from the connectors to the interaction region of the light signal with the microwave can be reduced and the bandwidth can be improved by shortening the delay line provided on the piezoelectric substrate having a large dielectric constant.

What is claimed is:

1. An optical waveguide device comprising:
   a first substrate having an electro-optical effect, the first substrate having thereon formed a first optical waveguide and a second optical waveguide, a first electrode through which a first electrical signal progresses that interacts with a light signal propagating along the first optical waveguide, and a second electrode through which a second electrical signal progresses that interacts with a light signal propagating along the second waveguide;
   the first substrate having thereon arranged a first and a second input sections corresponding respectively to the first and the second electrodes; and
   a second substrate on which are formed strip lines connecting the first and second input sections with a first and a second electric connectors that supply the first and the second electrical signals corresponding thereto, respectively,
   wherein a space between the strip lines on the second substrate at one end of the strip lines connected to the first and the second input sections is adapted to be narrower than a space between the strip lines at the other end of the strip lines connected to the first and the second electric connectors.

2. An optical waveguide device according to claim 1, wherein coplanar lines are formed as the strip lines formed on the second substrate.

3. An optical waveguide device according to claim 1, wherein LiNbO3 is used as the first substrate having an electro-optical effect.

4. An optical waveguide device according to claim 1, wherein the first and the second electrical signals have a frequency in microwave band and constitute optical modulators.

5. An optical waveguide device comprising:
   a first substrate having an electro-optical effect;
   an input section optical waveguide formed on the first substrate;
   an input-side waveguide branching section branching the input section optical waveguide into a first optical waveguide and a second optical waveguide;
   an output-side optical wave coupler section coupling the first optical waveguide and the second optical waveguide;
   a first electrode through which a first electrical signal progresses that interacts with light propagating along the first optical waveguide;
   a second progressive wave electrode through which a second electrical signal progresses that interacts with light propagating along the second optical waveguide, the first substrate having arranged on the same side a first and a second input sections corresponding respectively to the first and the second progressive wave electrodes; and a second substrate on which are formed strip lines connecting the first and second input sections with a first and a second electric connectors that supply the first and the second electrical signals corresponding thereto, respectively, wherein a space between the strip lines on the second substrate at one end of the strip lines connected to the first and the second input section is adapted to be narrower than a space between the strip lines at the other end connected to the first and the second electric connectors.

6. An optical waveguide device according to claim 5, wherein coplanar lines are formed as the strip lines formed on the second substrate.

7. An optical waveguide device according to claim 5, wherein LiNbO3 is used as the first substrate having an electro-optical effect.

8. An optical waveguide device according to claim 5, wherein the first and the second electrical signals have a frequency in microwave band and constitute optical modulators.

9. An Optical waveguide device comprising:

a first optical waveguide and a second optical waveguide formed on a substrate having an electro-optical effect;

a first electrode formed on a corresponding region above the first optical waveguide and receiving a first electrical signal;

a second electrode formed on a corresponding region above the second optical waveguide and receiving a second electrical signal;

a first and a second input sections corresponding respectively to the first and the second electrodes on the substrate; and strip lines on a second substrate connecting the first and the second input sections with a first and a second electric connectors that supply the first and the second electrical signals corresponding thereto, respectively, wherein the distance between the strip lines at one side connected to the first and the second input sections is narrower than the distance between the strip lines at the other side connected to the first and the second electric connectors.

10. An optical waveguide device comprising:

a piezoelectric substrate having an electro-optical effect, the piezoelectric substrate having thereon formed a first optical waveguide and a second optical waveguide that extend in parallel with each other, a first progressive wave electrode through which a first electrical signal progresses that interacts with a light signal propagating along the first optical waveguide to control the phase of the light signal, and a second progressive wave electrode through which a second progressive wave electrode through which a second electrical signal progresses that interacts with a light signal propagating along the second waveguide to control the phase of the light signal;

the piezoelectric substrate having thereon arranged a first and a second input sections corresponding respectively to the first and the second progressive wave electrodes; and a ceramic substrate on which are formed strip lines connecting the first and second input sections with a first and a second electric connectors that supply the first and the second electrical signals corresponding thereto, respectively, wherein a space between the strip lines on the ceramic substrate at one end of the strip lines connected to the first and the second input sections is adapted to be narrower than a space between the strip lines at the other end of the strip lines connected to the first and the second electric connectors.

11. An optical waveguide device according to claim 1, wherein coplanar lines are formed as the strip lines formed on the ceramic substrate.

12. An optical waveguide device according to claim 1, wherein

LiNbO3 is used as the piezoelectric substrate having an electro-optical effect.

13. An optical waveguide device according to claim 1, wherein the first and the second electrical signals have a frequency in microwave band and constitute optical modulators.

14. An optical waveguide device having:

a piezoelectric substrate having an electro-optical effect;

an input section optical waveguide formed on the piezoelectric substrate;

an input-side waveguide branching section branching the input section optical waveguide into a first optical waveguide and a second optical waveguide that extend in parallel with each other;

an output-side optical wave coupler section coupling the first optical waveguide and the second optical waveguide;

a first progressive wave electrode through which a first electrical signal progresses that interacts with light propagating along the first optical waveguide to control the phase of the light, the piezoelectric substrate having arranged on the same side a first and a second input sections corresponding respectively to the first and the second progressive wave electrodes; and a ceramic substrate on which are formed strip lines connecting the first and second input sections with a first and a second electric connectors that supply the first and the second electrical signals corresponding thereto, respectively, wherein a apace between the strip lines on the ceramic substrate at one end of the strip lines connected to the first and the second input section is adapted to be narrower than a space between the strip lines at the other end connected to the first and the second electric connectors.

15. An optical waveguide device according to claim 14, wherein coplanar lines are formed as the strip lines formed on the ceramic substrate.

16. An optical waveguide device according to claim 14, wherein LiNbO3 is used as the piezoelectric substrate having an electro-optical effect.

17. An optical waveguide device according to claim 14, wherein the first and the second electrical signals have a frequency in microwave band and constitute optical modulators.

* * * * *

UNITED STATES PATENT AND TRADEMARK OFFICE
CERTIFICATE OF CORRECTION

PATENT NO. : 6,961,494 B2  
APPLICATION NO. : 10/292494  
DATED : November 1, 2005  
INVENTOR(S) : Takehito Tanaka Page 1 of 1

It is certified that error appears in the above-identified patent and that said Letters Patent is hereby corrected as shown below:

Column 6, line 46, delete "LiNbO3" and insert -- $LiNbO_3$ --

Column 7, line 20, delete "LiNbO3" and insert -- $LiNbO_3$ --

Column 8, line 39, delete "light" and insert -- light;
     a second progressive wave electrode through which a second electrical signal progresses that interacts with light propagating along the second optical waveguide to control the phase of the light,--

Column 8, line 50, delete "apace" and insert -- space --

Signed and Sealed this

Fourteenth Day of November, 2006

JON W. DUDAS  
*Director of the United States Patent and Trademark Office*